Dec. 25, 1928.
M. F. MORAN
1,696,856
WEED EXTERMINATOR
Filed Dec. 4, 1926　　　　2 Sheets-Sheet 2
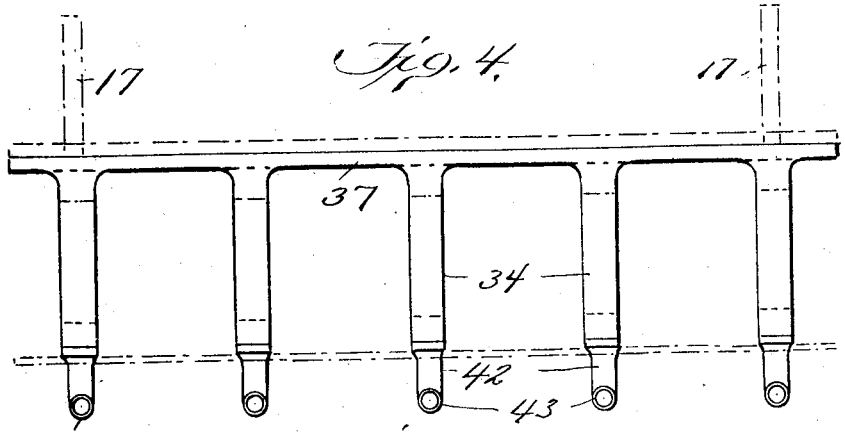
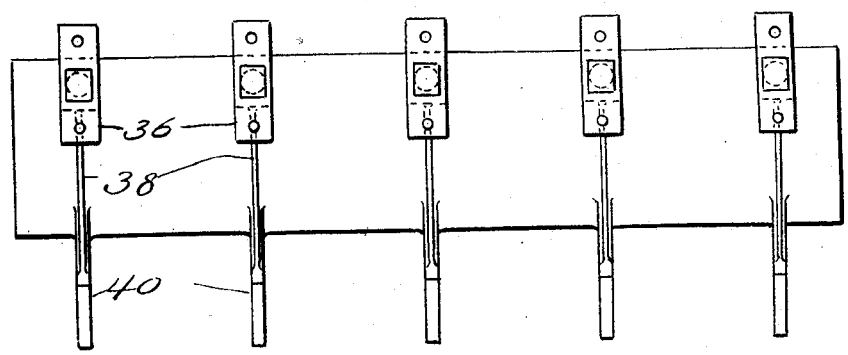
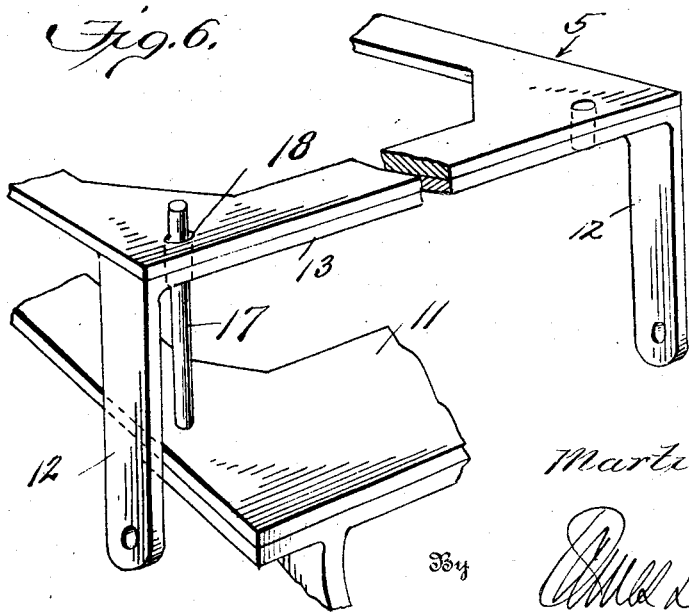
Inventor
Martin F. Moran
By
Attorney Patented Dec. 25, 1928.

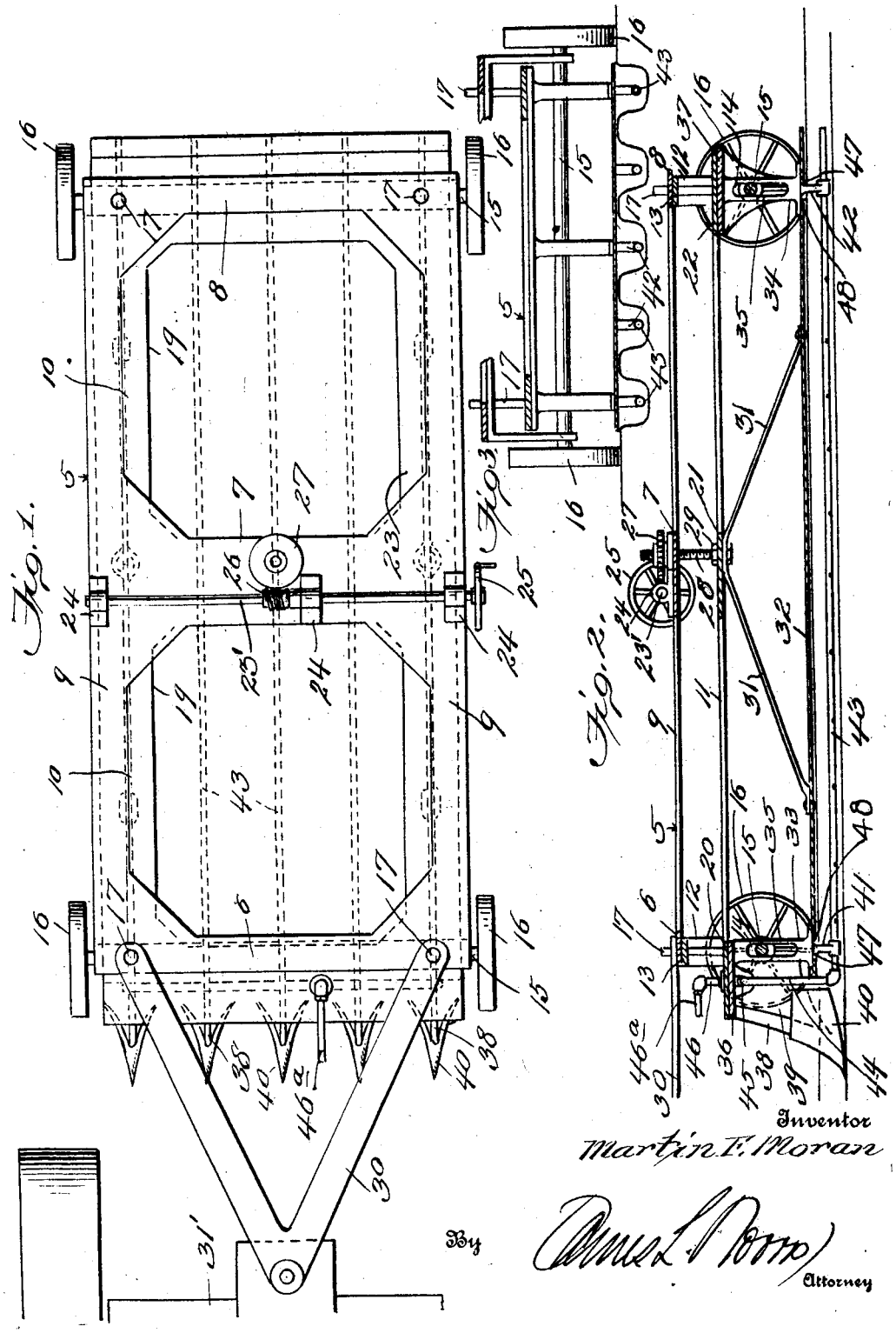

1,696,856

UNITED STATES PATENT OFFICE.

MARTIN F. MORAN, OF NEKOMA, KANSAS.

WEED EXTERMINATOR.

Application filed December 4, 1926. Serial No. 152,633.

This invention relates to a machine for killing weeds and analogous deleterious growths, and especially for destroying the roots of what is known as bindweed, by utilizing steam which is distributed evenly adjacent to or in contact with the roots of the weed, which are exposed in accordance with the operation of the machine.

The primary object of the invention is to provide a machine of this class which is adjustable vertically to regulate the depth of penetration of a series of furrow-forming devices or shovels arranged in transverse alinement at the front of the machine and to evenly distribute steam at high temperature in rear of the said furrow-forming devices for a considerable length along the furrows formed thereby, to effectively destroy the roots of the weed or other analogous growth.

A further object of the invention is to provide a machine of the class specified having furrow-forming devices and means for applying steam at the bottom of the furrows formed, and cover or close the upper portion of the furrows over the point of application of the steam, thus confining the latter and causing it to directly act upon the roots of the weed to effect the result desired.

With the foregoing and other objects and advantages in view, the invention consists in the construction and arrangement of the several parts which will be more fully hereinafter described and claimed.

In the drawings:

Fig. 1 is a top plan view of a machine embodying the features of the invention and shown attached to the rear of a tractor of well known type;

Fig. 2 is a longitudinal vertical section of the machine shown in operative position and depressed below the ground surface, the section illustrating one of the furrow-forming devices and the bottom of the furrow with the steam distributing means adjacent thereto;

Fig. 3 is a transverse section through the rear end of the machine broken away in part;

Fig. 4 is a rear elevation of a front member of the machine, showing parts in dotted association therewith and particularly illustrating the supporting means for the steam distributing or applying means and the furrow-forming devices;

Fig. 5 is an inverted plan view of the device shown by Fig. 4 and illustrating the standards for the plow or furrow-forming devices and their connection to the uprights through which the front axle of the machine is adjustably mounted; and Fig. 6 is a perspective view of a portion of the front of the machine, showing parts broken away and illustrating the adjustability of the parts.

The improved machine comprises a top frame 5 having a front cross bar 6, an intermediate cross bar 7 and a rear cross bar 8, all connected by longitudinal side bars 9 and forming the top of the machine, openings 10 being formed between the said bars to provide for lightness of structure and also to produce openings through the top of the machine. The top frame 5 is disposed over an intermediate frame 11, which mainly carries the working parts and is adjustable relatively to the top frame. The machine is portably supported by bearing hangers 12, depending from top cross yokes 13 and having suitable bearing openings 14 in their lower ends through which extend axles 15 of ground or carrying wheels 16, by which the machine may be readily transported or moved over the ground surface. To keep the adjustable intermediate frame 11 in regular movable association with the top frame 5, guide pins 17 rise from the opposite extremities of the frame 11 and pass upwardly through vertical openings 18 in the front and rear cross bars 6 and 8 and yokes 13 of the bearing hangers 12, said pins 17 being free to slide through the openings 18 and maintain the intermediate frame 11 and top frame 5 in constant spaced relation against shifting movement and at the same time allow freedom of movement during adjustment. The frame 11 is also constructed with openings 19 which are slightly smaller than the openings 10 of the frame 5 above, and furthermore, the said intermediate frame is formed with a front cross bar or member 20, an intermediate cross bar or member 21 and a rear cross bar or member 22 connected by side bars 23 similar to the construction of the frame 5. The end bars or members 20 and 22 are wider than the corresponding end bars 6 and 8 of the top frame, and on the intermediate member 7 of the top frame a transverse shaft 23' is mounted in suitable bearings 24 and has at one end a hand wheel 25 for operating the same and an intermediate worm 26, held in continual mesh with a worm wheel 27, from which depends a screw 28, extending through the member 7 of the top frame and connected by suitable nuts 29 to the corresponding member 21 of the adjustable frame 11. By this means the frame 11 and parts carried thereby may be raised and lowered relatively to the top frame 5 and the mechanism set for various operating purposes. Attached to the cross bar or front member 6 of the top frame 5 is a draft yoke 30, which is adapted to be connected to the rear portion of a suitable tractor 31', partially shown by Fig. 1.

By means of suitable braces 31 secured to the longitudinal side bars 23 of the frame 11 a metal covering plate 32 is horizontally fixed, the said braces being preferably of the form shown and serving to positively connect the plate 32 to the frame 11 and maintain a uniform distance of the said plate with relation to the frame. Rising from opposite extremities of the plate 32 are uprights 33 and 34, the rear uprights 34 as shown by Fig. 3 being less in number than the uprights 33, as there is less stress resistance at the rear of the machine than at the front. All of the uprights, however, are formed with vertical slots 35 of similar extent and through these slots the axles 15 of the carrying or ground wheels 16 freely extend for vertical movement or adjustment and whereby the frame 11 with the plate 32 and other parts may be adjusted relatively to the said axles to control the depth of disposition of the parts of the machine below the ground surface. The uprights 33 and 34 are connected with front and rear horizontal plates 36 and 37 which lie close against the undersides of the cross bars or members 20 and 22 of the frame 11, and projecting downwardly from the forward cross plate 36 are a series of plow posts or standards 38 which in the present instance preferably have flanges or webs 39 extending rearwardly therefrom and secured to the uprights 33. Applied to the plow posts or standards 38 are a series of shovel or analogous plows 40, as clearly shown by Figs. 1 and 2 and providing the furrow-forming devices for the machine. Extending from the lower terminals of the uprights 33 and 34 are hangers 41 and 42 which serve to support steam distributing pipes 43, which are perforated at their lower portions as clearly shown by Fig. 2, to distribute steam therefrom to the bottom of the furrow formed. These steam distributing pipes have vertical branches 44, which extend up to a common tubular head pipe 45, to which a supply pipe 46 is connected, the said supply pipe being carried forward and in turn connected to a steam supply that may be carried by or form a part of the tractor 31'. At the point where the head pipe 45 extends transversely under the plate 36 as shown by Fig. 2, suitable openings or clearance recesses 47 are formed in the strengthening flanges or ribs 39 so as to provide for connecting the branches 44 with the head pipe 45. At the points where the hangers 41 and 42 for the steam distributing pipes 43 are located, suitable openings 47 are formed in the plate 32, and these openings are covered by the base flanges 48 of the uprights 33 and 34. It will be seen that the plate 32, distributing pipes 43, branch connections 44, head pipe 45 and supply pipe 46 with the plow posts or standards 38 and shovels or analogous plows 40 all move together when adjustment is made to increase or decrease the depth of penetration of the plows. It will be understood that the steam supply pipe connection, as at 46ª, will be of a flexible character so as not to interfere with the adjustment just explained. The plate 32 acts to prevent escape of the steam and confines the latter in the furrows, to thus render the steam more effective in its killing action relatively to the roots of the weeds which it is desired to exterminate.

From the foregoing the operation of the machine will be readily understood, and as it is progressed forwardly, the plows 40 form furrows and cast the loosened earth laterally to thereby expose the roots of the weeds, the perforated pipes 43 distributing the steam in the furrows, which are closed and the steam confined therein by the plate 32, to thus effectively destroy the underground growth or roots of the weeds. At any time desired, the machine may be adjusted to increase or decrease the depth of the furrows or to maintain the plows 40 and steam distributing pipes at the proper depth in the ground to be most effective in performing their function. In view of the comparative simplicity of the machine, the operation thereof may be readily controlled and a comparatively large tract of land treated at one time. It will also be understood that if desired the machine may be increased in size and the number of plows with the steam distributing pipes similarly increased, and moreover, modifications in the details of construction of the several parts may be adopted at will without departing from the spirit of the invention or scope of the appended claims, and which contemplate the concentration or close application of the steam distributed by the pipes 43 to the roots of the weed to be destroyed without giving a chance for air to get to the live parts of the roots, to thereby effect a cooking of the roots and devitalization of the same, the plate 32 preventing escape of the steam prior to a thorough application thereof.

What is claimed as new is:

1. In a weed exterminator, the combination of a frame mounted on wheeled axles, a second frame adjustably mounted in relation to the first frame so as to move vertically, furrow-forming devices at the forward extremity of the adjustable frame, steam supply means having distributing members movable longitudinally along the furrows in rear of the furrow-forming devices, and a horizontal metal plate carried by said second frame and movable on the ground surface over the furrows and covering the steam distributing members, and operating to confine the steam in the furrows and to the roots of the weeds.

2. In a weed exterminator, the combination of a wheeled frame, a second frame adjustably held in relation to the wheeled frame and movable vertically varying distances, a horizontally disposed metal plate carried by the adjustable frame and in fixed relation to the latter, furrow-forming devices at the forward extremity of the adjustable frame, and steam supply means having perforated distributors in line with the centers of and extending longitudinally in rear of the furrow-forming devices adjacent the bottom of the furrows and located beneath and covered by the said plate to confine the steam in the furrows.

3. A weed exterminating machine of the class specified, comprising a wheeled frame, a second frame having vertically slotted uprights through which the axles of the wheeled frame adjustably extend, a metal plate below the top of and fixed to the adjustable frame and on which the uprights are supported, the latter having hangers depending therefrom, furrow-forming devices at the front extremity of the adjustable frame in advance of the said plate, and steam applying means consisting of supply connections and longitudinally disposed distributing members extending rearwardly under the plate from the furrow-forming devices and held in constant spaced relation to the plate by the said hangers, means also being provided for vertically shifting the said adjustable frame and for effecting a progression of the latter over the ground surface.

In testimony whereof I have hereunto set my hand.

MARTIN F. MORAN.